United States Patent [19]

Oda et al.

[11] Patent Number: 4,690,617
[45] Date of Patent: Sep. 1, 1987

[54] METAL-CERAMIC COMPOSITE ARTICLE AND A METHOD OF PRODUCING THE SAME

[75] Inventors: Isao Oda, Nagoya; Nobuo Tsuno, Kasugai, both of Japan

[73] Assignee: NGK Insulators, Ltd., Japan

[21] Appl. No.: 641,339

[22] Filed: Aug. 16, 1984

[30] Foreign Application Priority Data

Aug. 31, 1983 [JP] Japan ................... 58-158070

[51] Int. Cl.$^4$ .................................. F01D 5/28
[52] U.S. Cl. ...................... 416/241 B; 416/244 A; 403/30; 403/373; 92/248
[58] Field of Search ........... 416/241 B, 244 R, 244 A; 403/30, 372, 373, 365; 92/248, 255

[56] References Cited

U.S. PATENT DOCUMENTS

| | | | |
|---|---|---|---|
| 1,794,782 | 3/1931 | Lord | 403/203 |
| 1,940,870 | 12/1933 | Litton | 285/187 |
| 2,297,508 | 9/1942 | Schutte | 416/244 R |
| 2,891,525 | 6/1959 | Moore | 123/90.51 |
| 2,933,386 | 4/1960 | Pessel | 419/45 |
| 3,321,565 | 5/1967 | Peterson et al. | 264/162 |
| 3,604,819 | 9/1971 | Krahe | 416/204 |
| 3,666,302 | 5/1972 | Kellett | 416/244 R |
| 3,801,226 | 4/1974 | Bevan et al. | 416/241 B |
| 4,014,968 | 3/1977 | Simon | 264/56 |
| 4,123,199 | 10/1978 | Shimizu et al. | 416/241 B X |
| 4,176,519 | 12/1979 | Kronogard | 416/241 B X |
| 4,214,906 | 7/1980 | Langer et al. | 416/241 B X |
| 4,256,441 | 3/1981 | Arora | 417/407 |
| 4,270,380 | 6/1981 | Gulati et al. | 72/467 |
| 4,279,576 | 7/1981 | Okano et al. | 417/407 |
| 4,281,941 | 8/1981 | Rottenkolber | 416/241 B |
| 4,325,647 | 4/1982 | Maier et al. | 403/29 |
| 4,341,826 | 7/1982 | Prewo et al. | 428/35 |
| 4,404,935 | 9/1983 | Kraft | 92/248 X |
| 4,424,003 | 1/1984 | Brobeck | 416/241 B |
| 4,479,293 | 10/1984 | Miller et al. | 29/156.8 R |
| 4,479,735 | 10/1984 | Thompson et al. | 403/30 X |
| 4,492,737 | 1/1985 | Conolly | 428/552 |
| 4,495,684 | 1/1985 | Sander et al. | 29/156.5 R |
| 4,503,009 | 3/1985 | Asaka | 419/6 |
| 4,518,315 | 5/1985 | Kruger | 416/241 B |
| 4,531,269 | 7/1985 | LaBouff | 29/156.5 R |
| 4,548,786 | 10/1985 | Yohe | 419/29 |
| 4,614,453 | 9/1986 | Tsuno et al. | 403/30 |

FOREIGN PATENT DOCUMENTS

| | | |
|---|---|---|
| 95540 | 12/1983 | European Pat. Off. . |
| 142334 | 5/1985 | European Pat. Off. . |
| 139406 | 5/1985 | European Pat. Off. . |
| 2457231 | 4/1976 | Fed. Rep. of Germany . |
| 2734747 | 2/1979 | Fed. Rep. of Germany . |
| 58-214018 | 1/1983 | Japan . |
| 897377 | 11/1953 | Switzerland . |
| 304836 | 1/1955 | Switzerland . |
| 1394919 | 5/1975 | United Kingdom . |
| 2104551 | 3/1983 | United Kingdom . |
| 502133 | 4/1976 | U.S.S.R. . |

OTHER PUBLICATIONS

American Society for Metals; vol. 3, Ed. 9, U.S. Ohio, 1980 "Properties and Selections: Stainless Steels, Tool Materials and Special Purpose Metals".
687 M.T.Z. Motortechnische Zeitschrift vol. 44 (1983) Jun., No. 6, Schwabisch Gmund, Deutschland.

*Primary Examiner*—Robert E. Garrett
*Assistant Examiner*—Joseph M. Pitko
*Attorney, Agent, or Firm*—Parkhurst & Oliff

[57] ABSTRACT

A metal-ceramic composite article obtained by press fitting a projection of a ceramic member into a hole formed in a metallic member has a high bonding force in the press-fitted portion and is free from separation between the ceramic member and the metallic member. The composite article exhibits high thermal resistance or wear resistance when used as a piston crown in a piston for an adiabatic engine or when used as a cam contacting surface of a tappet.

17 Claims, 8 Drawing Figures

METAL-CERAMIC COMPOSITE ARTICLE AND A METHOD OF PRODUCING THE SAME

CROSS REFERENCE TO RELATED APPLICATION

This application is related to co-pending application Ser. No. 700,103, filed Feb. 11, 1985, titled Turbine Rotor Units and Method of Producing the Same.

BACKGROUND OF THE INVENTION (1) Field of the Invention

The present invention relates to a metal.ceramic composite article comprising a metal and a ceramic bonded together by a mechanical means, and a method of producing the same.

(2) Description of the Prior Art

Ceramics, such as zirconia, silicon nitride, silicon carbide and the like, have recently attracted public attention as a high-temperature structural material or wear-resistant material for gas turbine engine parts, internal-combustion engine parts and the like due to their excellent mechanical strength, thermal resistance and wear resistance. However, ceramics are generally hard and brittle, and therefore ceramics are inferior to metals in formability and workability. Further, ceramics are poor in the resistance against impact force due to their poor toughness. Therefore, it is difficult to produce machine parts, such as engine parts and the like, from ceramics alone, and ceramics are generally used in the form of a composite article comprising a ceramic member and metallic member bonded thereto.

There has been known an interference fit structure as a mechanically bonded structure for a metallic member and a ceramic member in a metal/ceramic composite article to be used as engine parts. As the bonding structure of such metal.ceramics composite article, there have been known a bonding structure in a piston for adiabatic engine, comprising a metal piston body and a ceramics piston crown (Japanese Patent Laid-open Specification No. 122,659/81), wherein a metal ring is fitted around a ceramics piston crown through an interference fit, and a piston body is cast around the metal ring; a bonding structure in a tappet (WO No. 82/01034), wherein a ceramic member is fitted to the cam contacting surface of a cast iron tappet through an interference fit so as to form the cam contacting surface by the ceramic; and the like. However, the interference fit structure has the following drawbacks.

(1) Members to be bonded must be worked in a high accuracy. That is, in the interference fit structure, one of the members to be fitted is heated or cooled to cause a dimensional difference sufficiently large enough to fit both the members between them, and both the members are fitted to each other by the use of this dimensional difference. Therefore, the dimensional difference at the interference fit temperature and the interference after interference fit depend upon the accuracy in the production of both the members. When the accuracy is poor, the variation of the dimensional difference at the interference fit temperature, and the variation of the interference fit are large, and hence not only a stable interference fit cannot be carried out, but also the bonding force in the fitted portion by the interference fit is not uniform.

(2) Parts having a small dimension cannot be bonded. That is, the thermal expansion amount, at the interference fit temperature, of the members to be fitted by interference varies in proportion to the dimension of the members. In order to cause a dimensional difference large enough to fit members having a small dimension with each other, a high interference fit temperature is required. When an interference fit temperature is high, the metallic member changes its metallic texture, transforms its phase and softens, or a large temperature difference is formed between the metallic member and a ceramic member to be bonded with the metallic member, and the ceramic member is broken due to thermal shock. Therefore, there is a certain limit in the dimension of members to be fitted by the interference fit.

SUMMARY OF THE INVENTION

The object of the present invention is to provide a metal.ceramic composite article having a novel bonding structure of bonding members, which is free from high accuracy in the working for the production of the members to be bonded, and further free from the limitation in the dimension of the members to bonded.

One of the features of the present invention lies in a metal.ceramic composite article comprising a metallic member having a hole or through-hole, and a ceramic member having a projection, the projection of the ceramic member having been press fitted into the hole of the metallic member such that a gap is present between the edge of the hole of the metallic member and the bottom of the projection of the ceramic member at the use temperature of the composite article.

Another feature of the present invention lies in a method of bonding monolithically a metallic member with a ceramic member, comprising producing a metallic member haivng a hole and a ceramic member having a projection, whose diameter is larger by 0.5-5% than the inner diameter of the hole of the metallic member; and press fitting the projection into the hole at room temperature or at a temperature being not higher than the annealing temperature of the metallic member but being not lower than the highest temperature, to which the press-fitted portion is exposed during the use of the composite article.

A further feature of the present invention lies in a method of bonding monolithically a metallic member with a ceramic member, comprising producing a metallic member having a hole and a ceramic member having a projection, whose diameter is larger by 0.5-5% than the inner diameter of the hole of the metallic member; press fitting the projection into the hole at room temperature or at a temperature being not higher than the annealing temperature of the metallic member but being not lower than the highest temperature, to which the press-fitted portion is exposed during the use of the composite article; finishing the surface of the metallic member into a given dimension; and hardening a part or whole of the surface of the metallic member by any one of the methods of carburizing, nitriding, surface quenching and metal plating.

DESCRIPTION OF THE PREFERRED EMBODIMENT

Figure 1:
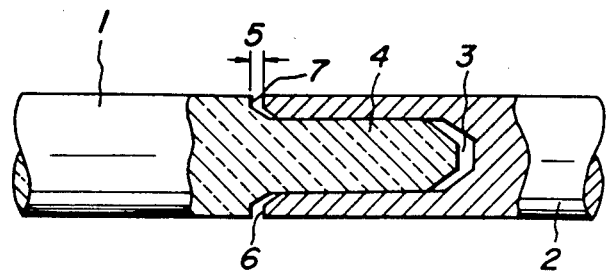
FIG. 1 is an explanative view, partly in section, illustrating one embodiment of the bonding structure of the metal.ceramics composite article of the present invention.

The term "press fitting" used in the present invention means that a projection formed on a ceramic member is forcedly pressed and fitted under load into a hole formed in a metallic member, the metallic member having a diameter smaller than the diameter of the above described projection.

The metal.ceramic composite article can be obtained by pressing forcedly a projection formed on a ceramic member into a hole formed in a metallic member and having a diameter smaller than that of the projection of the ceramic member. In this case, the shape, dimension, thickness and the like of the hole of the metallic member are determined such that the dimensional difference between the projection of the ceramic member and the hole of the metallic member is absorbed by plastic deformation and elastic deformation of the metallic member. Therefore, it is not necessary to limit strictly the difference in the finishing dimension between the hole and the projection in the press-fitted portion.

As the dimensional difference between the projection of a ceramic member and the hole of a metallic member at the press fitting, the diameter of the projection is preferred to be 0.5–5% larger than the inner diameter of the hole. In order to decrease the load required for the deformation and press fitting of a metallic member, the diameter of the projection is particularly preferred to be 0.5–1% larger than the inner diameter of the hole. Further, when it is intended to produce a metal.ceramic composite article having a large bonding force in the press-fitted portion under low press-fitting load, the dimensional difference is preferred to be 1–4%. However, the load required for press fitting and the bonding force depend upon the hardness of the metallic member, the wall thickness of the hole thereof, the surface roughness of the inner surface of the hole thereof, the surface roughness of the projection of the ceramic member, and the shape of the tip of the projection thereof. Therefore, it is preferable to determine the above described dimensional difference by taking these conditions also into consideration. When this dimensional difference is less than 0.5%, the bonding force in the press-fitted portion is poor, and the projection of the ceramic member is separated from the hole of the metallic member at the press-fitted portion. When the dimensional difference is more than 5%, a high load is required for the press fitting, and the projection of the ceramic member is broken during the press fitting. Therefore, the dimensional difference of less than 0.5% or more than 5% is not preferable.

The press-fitting may be effected at room temperature, or by heating the metallic member or both the metallic member and the ceramic member. When the metallic member or both the metallic and ceramic members are heated, the heating temperature should be not higher than the annealing temperature of the metallic member but not lower than the highest temperature, to which the press-fitted portion is exposed during the use. When the press-fitting temperature is higher than the annealing temperature of the metallic member, the internal stress and strain developed due to press fitting in the vicinity of the hole of the metallic member are relaxed, and the bonding force at the press-fitted portion is decreased. When both the metallic member and the ceramic member are heated and press fitted, if the press fitting is carried out at a temperature lower than the use temperature of the press-fitted portion, the bonding force in the press-fitted portion lowers due to the temperature rise during the use. Therefore, a press-fitting temperature higher than the annealing temperature of metallic member or lower than the use temperature of the press-fitted portion should not be used.

In the metal-ceramic composite article of the present invention, it is necessary that the hole of a metallic member deforms during the press fitting of the ceramic member into the metallic member. For this purpose, it is preferable to use a metallic member after its hardness has been adjusted by heat treatments, such as quenching, tempering, normalizing, annealing and the like. When a metallic member previously hardened by quenching is used, the metallic member must be worked into a dimension or shape, under which the hole of the metallic member can be deformed.

When a press-fitted metallic member is required to have a wear resistance, the total surface or a part of the surface of the metallic member is hardened by carburizing, nitriding, surface quenching, metal plating and the like. The hardening treatment of the surface of metallic member may be effected before the press fitting.

The present invention will be explained in more detail referring to the drawings.

Figure 2:
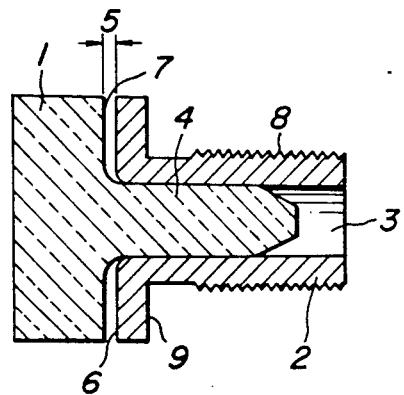
FIG. 2 is a longitudinal sectional view illustrating another embodiment of the bonding structure of the metal.ceramics composite article of the present invention.

FIGS. 1 and 2 illustrate embodiments of the metal.ceramic composite article of the present invention. FIG. 1 is a longitudinal sectional view of the fitted portion of a metal.ceramic composite article of the present invention, comprising a ceramic member 1 having a projection 4 formed thereon, and a metallic member 2 having a hole 3 formed therein, which projection 4 has been forcedly press fitted into the hole 4 so as to form a gap 5 between the bottom 7 of the projection 4 of the ceramic member and the edge 6 of the hole 3 of the metallic member at the use temperature of the composite article.

The tip of the projection formed on the ceramic member and the inlet portion of the hole formed in the metallic member may be made into a conical shape in order to press fit easily both of the members together.

It is desirable that the metal and ceramic constituting the metal.ceramic composite article of the present invention have the same coefficient of thermal expansion with each other. However, the coefficient of thermal expansion of a metal is generally higher than that of ceramics. Therefore, in the case where a gap is not present between the bottom 7 of the projection 4 of the ceramic member 1 and the edge 6 of the hole 3 of the metallic member 2, when the temperature of the press-fitted portion is raised, the ceramic member is broken due to the difference in the thermal expansion between the metallic member and the ceramic member. In order to overcome this drawback, a gap 5 is formed in the metal.ceramic composite article of the present invention.

In the present invention, there may be present in the gap 5 an elastic material or a substance, such as flash or the like, which has been formed during the finishing working of a metallic member after press fitting, and is substantially freely deformable by the stress due to the difference in the thermal expansion between the ceramic member and the metallic member. This case also can be considered that the gap 5 is present between the bottom 7 of the projecton 4 and the edge 6 of the hole 3. In the present invention, it is necessary that the dimension of the gap 5 satisfies the following relation.

(Dimension of gap 5) > (Difference in the thermal expansion between a metallic member and a ceramic member) × (Press-fitted distance × Highest use temperature)

The gap can be formed by using a spacer or by carrying out a press-fitting operation at a temperature higher than the highest use temperature of the press-fitted portion.

FIG. 2 illustrates another embodiment of the press-fitted portion of the metal.ceramics composite article of the present invention, comprising a ceramic member 1 having a projection 4 formed thereon, and a cylindrical metallic member 2 having a hole 3 formed herein and having at one end of the shank thereof a flange 9 having a diameter larger than the outer diameter of the shank; said projection 4 having been press fitted into the hole 3 so as to form a gap 5 between the bottom 7 of the projection 4 and the edge 6 (surface of the flange 9) of the hole 3 at the use temperature of the composite article. The merit of the presence of the flange 9 is as follows. When another metallic member is connected to and fastened to the shank of the metallic member of the metal.ceramics composite article of the present invention by means of screw threads 8 arranged on the other end of the shank, the axial force caused by the fastening by the screw threads and the stress caused by the difference in the thermal expansion between the shank of the metal.ceramics composite article of the present invention and the second metallic member connected to the shank do not act on the ceramic member. In the present invention, a structure, such as a shoulder, having the same function as that of flange is also handled as a flange.

Figure 3:
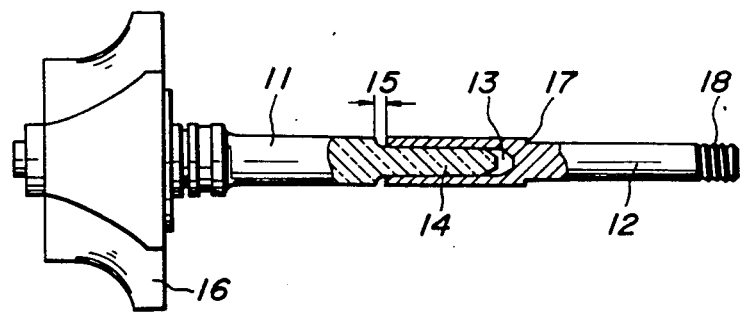
FIG. 3 is an explanative view, partly in section, illustrating a press-fitted portion of a ceramic member into a metallic member in a turbo-charger rotor in a practical application of the metal.ceramics composite article of the present invention.

FIG. 3 is a side view, partly in section, of a turbocharger rotor, illustrating the practical application of the metal.ceramic composite article of the present invention, which turbo-charger rotor comprises a ceramic rotary shaft 11 being formed into a monolithic structure together with a ceramic turbine wheel 16 and having a projection 14 at the tip, and a steel rotary shaft 12 having a hole 13 at the tip and being arranged on the compressor wheel side, said projection 14 having been press fitted into the hole 13.

In this turbo-charger rotor, a gap 15 is formed in order to prevent the breakage of the ceramic due to the difference in the thermal expansion between the metal and the ceramic of the press-fitted portion. Further, a flange 17 is formed in order that an axial force, which acts on the shaft in the case where bearings incorporated into the shaft arranged on the compressor wheel side and the compressor wheel (both the bearing and the compressor are not shown) are fastened by a nut, and the stress due to the difference in the thermal expansion between an aluminum alloy compressor wheel and the steel rotary shaft 12 do not act on the ceramic rotary shaft.

Figure 4:
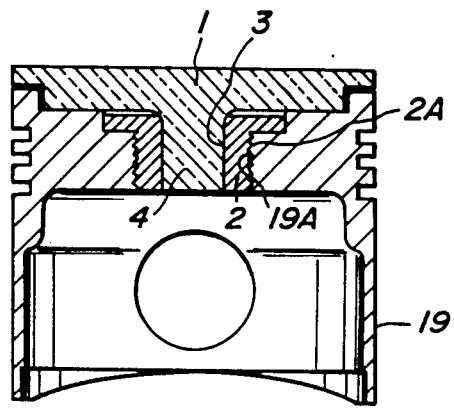
FIG. 4 is a longitudinal sectional view of a piston for an adiabatic engine, illustrating one embodiment of a combination use of the metal.ceramic composite article of the present invention with another metallic member.
Figure 5:
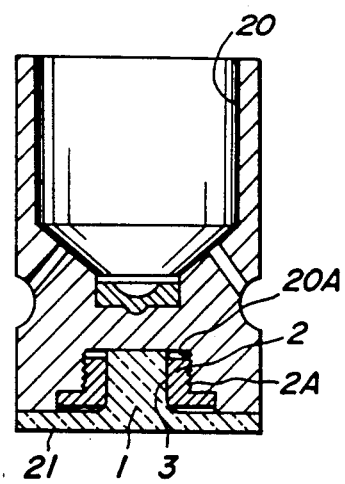
FIGS. 5 and 6 are longitudinal sectional views of tappets, illustrating other embodiments of the combination use of the metal.ceramic composite article of the present invention with another metallic member.
Figure 6:
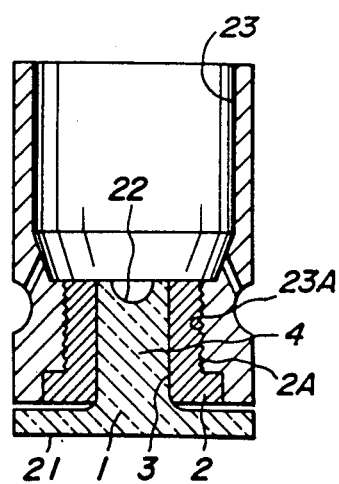

FIG. 4, 5 and 6 are longitudinal sectional views of a piston for adiabatic engine, and tappets, illustrating practical application of the metal.ceramic composite article of the present invention. The piston or tappets comprises a metallic member 2 having a through-hole 3 formed therein; a ceramic member having a projection 4, whose diameter is larger than the inner diameter of the through-hole 3, said projection 4 having been press fitted into the through-hole 3; and another metallic member bonded to the metal.ceramic composite article by the use of screw threads 2A formed on the outer periphery of the shank of the composite article.

FIG. 4 is a longitudinal sectional view of a piston for an adiabatic engine, comprising a metal piston body and a ceramic piston crown formed of the ceramic member of a metal.ceramic composite article of the present invention. In this piston, the metal piston body 19 is formed, in a part of its crown portion, with a hole, which is partly formed of a through-hole, and into which the metallic member of a metal.ceramic composite article of the present invention can be fitted, and the metal.ceramic composite article is threadedly fitted into the hole and is fixed to the metal piston body 19 by means of screw threads 19A formed in the through-hole and screw threads 2A formed on the metallic member of the metal-ceramic composite article.

FIG. 5 is a longitudinal sectional view of a tappet having a ceramic material for its cam contacting surface 21. In the tappet shown in FIG. 5, a hole into which the metallic member of a metal.ceramic composite article of the present invention can be fitted, is formed in the cam contacting surface of a metal tappet 20, and the metal.-ceramic composite article is threadedly fitted into the hole and is fixed to the metal tappet 20 by means of screw threads 20A formed in the hole and screw threads 2A formed on the metallic member of the metal.ceramic composite article.

FIG. 6 is a longitudinal sectional view of a tappet having a ceramic material for its cam contacting surface 21 and in its contacting surface 22 with a push rod. In the tappet shown in FIG. 6, a through-hole, into which the metallic member of a metal.ceramic composite article of the present invention can be fitted, is formed in the cam contacting surface of the metal tappet 23, and the metal.ceramic composite article is threadedly fitted into the hole and is fixed to the metal tappet 23 by means of screw threads 23A formed in the through-hole and screw threads 2A formed on the outer periphery of the metallic member of the metal.ceramic composite article.

The ceramic constituting the metal.ceramic composite article of the present invention can be selected from silicon nitride, silicon carbide, partially stabilized zirconia, alumina, beryllia and the like depending upon the intended purpose of the metal.ceramic composite article. For example, when a turbo-charger rotor is produced from a metal.ceramic composite article of the present invention, it is desirable to use silicon nitride having an excellent high-temperature strength in the turbine wheel exposed to high temperature and in the rotary shaft connected to the turbine wheel. When a tappet is produced by using a metal.ceramic composite article of the present invention in its cam contacting surface, it is desirable to use partially stabilized zirconia having high strength and toughness as the ceramic member. When a piston for an adiabatic engine is produced by using, in its piston crown, the ceramic member of a metal.ceramic composite article of the present invention, it is desirable to use partially stabilized zirconia having almost the same coefficient of thermal expansion with that of cast iron as the ceramic member.

The following examples are given for the purpose of illustration of this invention and are not intended as limitations thereof.

EXAMPLE 1

A silicon nitride round rod produced by an atmospheric pressure sintering method was worked into a ceramic member having a projection having a diameter of 3.1 mm and a length of 20 mm. An annealed chromium molybdenum steel (JIS-SCM 435) round rod was worked into a metallic member having a shank of 5 mm diameter, which was formed in one end with a hole having an inner diameter of 3.0 mm and a depth of 25 mm and at the other end with screw threads. The projection of the ceramic member was press fitted into the hole of the metallic member at 20° C. to produce two kinds of metal.ceramic composite articles having a gap (shown by C in FIG. 7) between the edge of the hole of the metallic member and the bottom of the projection of the ceramic member, one of which (composite article A) had the gap of 0.2 mm and the other of which (composite article B) had a gap of 0 mm. When the resulting metal.ceramic composite articles were heated up to 300° C. in a furnace, the composite article A did not extraordinarily change at all, but the composite article B was broken at 200° C. at the portion R of the ceramic member during the course of heating.

EXAMPLE 2

A composite article A produced in the same manner as described in Example 1 was subjected to an ionic nitriding treatment at 530° C. for 10 hours under a pressure of 2 Torr under a mixed atmosphere of 8 parts of nitrogen and 2 parts of hydrogen. By this ionic nitriding treatment, the surface hardness (Vickers hardness) of the metallic member was increased from the original Hv 150 up to Hv 860. Moreover, the above treated metallic member had Hv 500 at a position of the depth of as large as 0.16 mm from the surface. There was no extraordinary change at the press-fitted portion of the ceramic member into the metallic member even by this ionic nitriding treatment.

EXAMPLE 3

A ceramic member having a projecting which had a diameter shown in the following Table 1 and had a length of 20 mm, was produced from a silicon nitride round rod produced by an atmospheric sintering method. A metallic member formed in one end with a hole having a diameter shown in the following Table 1 and at the other end with screw threads was produced from an annealed aluminum chromium molybdenum steel (JIS-SACM 645). The projection of the ceramic member was press fitted into the hole of the metallic member under the condition shown in Table 1 to produce a metal.ceramic composite article illustrated in FIG. 7. The resulting metal.ceramic composite article was held by means of a jig shown in FIG. 8, and that portion of the composite article which was shown in FIG. 8 was placed in a heating furnace, and heated up to a temperature described in Table 1. The composite article was pulled in up and down directions, and the load required for the separation of the ceramic and metallic members at the press-fitted portion was measured. The obtained results are shown in Table 1.

Figure 7:
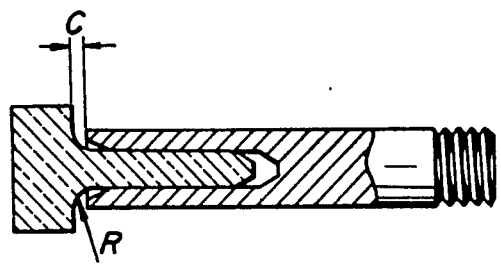
FIG. 7 is an explanative view, partly in section, illustrating other embodiment of the bonding structure of the metal.ceramic composite article of the present invention.
Figure 8:
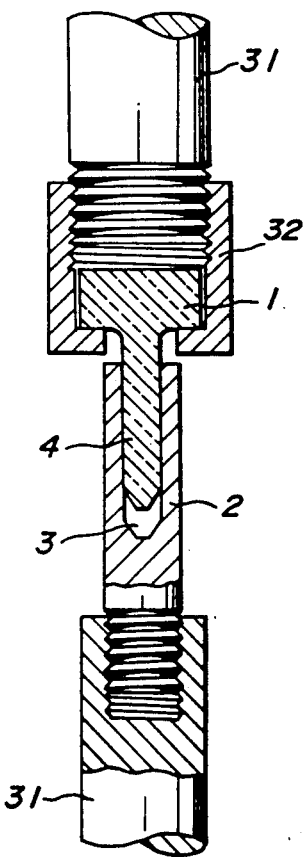
FIG. 8 is an explanative view, partly in section, illustrating a pulling test of the metal.ceramic composite article of the present invention.

In sample Nos. 1 and 2, the ceramic member was broken at the portion R shown in FIG. 7. Therefore, it is clear that the load (bonding force) required for the separation of the ceramic member from the metallic member at the press-fitted portion is higher than the breakage load of the portion R of the ceramic member.

TABLE 1

| | Sample No. | Press-fitting condition | | | | | | | Pulling test | | |
|---|---|---|---|---|---|---|---|---|---|---|---|
| | | Diameter of a projection formed on ceramic member (mm) | Inner diameter of a hole formed in metallic member (mm) | Outer diameter of a shank of metallic member (mm) | Press-fitting temperature (°C.) | Hardness of metallic member | Gap (mm) | Press fitting | Test temperature (°C.) | Load (kg) | Result |
| Composite article of this invention | 1 | 3.1 | 3.0 | 6.5 | 25 | HRB 75 | 0.2 | Y | 25 | 143 | Ceramic member is broken at portion R |
| | 2 | 3.1 | 3.0 | 6.5 | 25 | HRB 75 | 0.2 | Y | 150 | 139 | Ceramic member is broken at portion R |
| | 3 | 3.1 | 3.0 | 6.5 | 300 | HRB 75 | 0.2 | Y | 300 | 190 | Separated at the press-fitted portion |
| | 4 | 3.1 | 3.0 | 6.5 | 350 | HRB 75 | 0.2 | Y | 300 | 210 | Separated at the press-fitted portion |
| | 5 | 3.05 | 3.0 | 6.5 | 350 | HRB 75 | 0.2 | Y | 300 | 150 | Separated at the press-fitted portion |
| | 6 | 5.1 | 5.0 | 8.5 | 350 | HRB 75 | 0.2 | Y | 300 | 250 | Separated at the press-fitted portion |
| | 7 | 5.2 | 5.0 | 8.5 | 350 | HRB 75 | 0.2 | Y | 300 | 320 | Separated at the press-fitted portion |
| Comparative composite article | 101 | 3.1 | 3.0 | 6.5 | 25 | HRC 40 | — | N | — | — | |
| | 102 | 3.1 | 3.0 | 16 | 25 | HRB 75 | — | N | — | — | |
| | 103 | 3.3 | 3.0 | 6.5 | 300 | HRB 75 | — | N | — | — | |
| | 104 | 3.1 | 3.0 | 6.5 | 25 | HRB 75 | 0.2 | Y | 300 | 38 | Separated at the press-fitted portion |

TABLE 1-continued

| | Press-fitting condition | | | | | | | Pulling test | | |
|---|---|---|---|---|---|---|---|---|---|---|
| Sample No. | Diameter of a projection formed on ceramic member (mm) | Inner diameter of a hole formed in metallic member (mm) | Outer diameter of a shank of a metallic member (mm) | Press-fitting temperature (°C.) | Hardness of metallic member | Gap (mm) | Press fitting | Test temperature (°C.) | Load (kg) | Result |
| 105 | 5.02 | 5.0 | 8.5 | 300 | HRB 75 | 0.2 | Y | 300 | 30 | Separated at the press-fitted portion |

Y: press fitting is possible
N: press fitting is impossible

It can be seen from Table 1 that the metal.ceramic composite article has a large bonding force even at a high temperature of 300° C.

On the contrary, in the comparative samples illustrating metal.ceramic composite articles outside the scope of the present invention, the projection of ceramic member cannot be press fitted into the hole of the metallic member, or even when the press fitting was able to be effected, the bonding force between the metallic member and ceramic member is poor. The composite articles of comparative sample Nos. 101, 102 and 103 are higher than the composite article of the present invention in the hardness of metallic member, in the thickness of the outer wall of the hole of the metallic member, and in the difference between the dimension of the projection of the ceramic member and that of the hole of the metallic member. Therefore, the projection of ceramic member was broken during the press-fitting.

Comparative sample Nos. 104 and 105 illustrate a case wherein the pulling test temperature is higher than the press-fitting temperature, and a case wherein the difference between the dimension of the projection of ceramic member and the dimension of the hole of metallic member is smaller than the difference defined in the present invention, respectively. In both the cases, the bonding force is weak, and the projection of the ceramic member was separated from the hole of the metallic member at the press-fitted portion under a low load.

EXAMPLE 4

A ceramic member having a total length of 72 mm, which had a monolithic structure consisting of a turbine wheel having a diameter of 61 mm and a turbine shaft having a diameter of 9 mm, was produced from silicon nitride obtained by an atmospheric pressure sintering. The tip of the turbine shaft of the ceramic member was worked into a projection having a diameter of 6.0 mm and a length of 17 mm. A hole having an inner diameter of 5.8 mm and a depth of 19 mm was formed in one end of an aluminum chromium molybdenum steel (JIS-SACM 645) having a total length of 70 mm and a diameter of 9 mm. The projection formed at the tip of the turbine shaft was press fitted into the hole of the steel at 350° C. to produce a turbo-charger rotor, wherein its turbine wheel and a part of its turbine shaft were formed of silicon nitride, and the gap between the edge of the hole and the bottom of the projection was 0.05 mm. The rotary shaft of the turbo-charger rotor in the compressor wheel side was worked into a rod having a diameter of 5 mm and having a shape shown in FIG. 3. An aluminum alloy (JIS-AC4C) cylinder having an inner diameter of 5.2 mm, an outer diameter of 30 mm and a length of 25 mm was fitted on the rotary shaft 12 arranged on the compressor wheel side, and fixed thereat by means of a nut under a fastening torque of 15 kg.cm between a flange 17 and screw threads formed at the end of the rotary shaft on the compressor wheel side. When the turbo-charger rotor was heated up to 200° C. in an electric furnace, there were no extraordinary change in the press-fitted portion of the ceramic and metallic members of the turbine shaft, in the compressor shaft, and in the screw threaded portion.

EXAMPLE 5

A turbo-charger rotor having a shape illustrated in FIG. 3 was produced in the same manner as described in Example 4. The turbo-charger rotor was placed at a high-temperature rotary tester, and a rotation test was effected at a rate of 150,000 rpm for 1 hour by a combustion gas. However, no extraordinary change was observed in the turbo-charger rotor.

EXAMPLE 6

A disk having a diameter of 69 mm and a thickness of 3 mm, and having on its center a projection having a diameter of 15 mm and a length of 15 mm, was produced from a partially stabilized zirconia ceramic containing 5.2% of $Y_2O_3$. A metallic member having a flange of 35 mm outer diameter, a shank of 25 mm outer diameter and a hole of 14.8 mm inner diameter, and having a total length of 10 mm was produced from a nodular cast iron. The projection of the zirconia ceramic member was press fitted into the hole of the metallic member at 500° C. to produce a metal.ceramic composite article.

A hole, which was partly formed of a through-hole and was able to be fitted with the metal.ceramic composite article, was formed in a part of the piston crown of a nodular cast iron piston having a diameter of 70 mm. The nodular cast iron piston was fixed to the metal.ceramic composite article by means of screw threads formed in the through-hole and screw threads formed on the shank of the metallic member of the composite article to produce a piston for an adiabatic engine, as illustrated in FIG. 4, the piston crown of which was partly formed of a partially stabilized zirconia ceramic and the piston body of which was formed of nodular cast iron. Even when this piston was driven by means of a Diesel engine having a cylinder bore diameter of 70 mm, a stroke of 75 mm and an engine speed of 2,200 rpm, no extraordinary change was observed.

As described above, the metal.ceramic composite article of the present invention is produced by press fitting a projection of a ceramic member into a hole of a metallic member under load, which hole has an inner diameter smaller than the diameter of the projection, such that a gap is present between the bottom of the projection of the ceramic member and the edge of the hole of the metallic member at the use temperature of the metal.ceramic composite article. Therefore, it is not necessary to work the ceramic member and the metallic member in so high accuracy as the accuracy in the interference fitting, and moreover there is no limitation in the dimension of the resulting composite article. Furthermore, the breakage of the press-fitted portion due to the difference in the coefficient of thermal expansion between the ceramic and metal can be prevented.

Particularly, a turbo-charger rotor, which has been produced by press fitting a metal shaft to a ceramic shaft connected monolithically to a ceramic turbine wheel, is a high-efficiency turbo-charger rotor due to the reason that the turbine is made of ceramics having a light-weight and an excellent high-temperature strength.

Further, in a piston for an adiabatic engine, having a piston crown partly formed of ceramics and having a piston body formed of metal, which has been produced by forming a hole capable of being fitted with a metal.-ceramic composite article of the present invention in the piston crown of the metal piston, and fixing the piston crown and the metal.ceramic composite article by means of screw threads formed in the hole and screw threads formed on the shank of the metallic member of the metal.ceramic composite article, ceramics having a high heat-insulating property can be used in the piston crown exposed to a high-temperature combustion gas. Therefore, according to the present invention, a piston having a high heat-insulating effect can be easily produced.

In the tappet also, the metal.ceramic composite article of the present invention is fitted into a hole formed in the cam contacting surface to form a cam contacting surface made of ceramics. Therefore, a tappet having an excellent wear resistance can be produced.

As described above, the metal.ceramic composite article of the present invention can be used as such or in combination with other metallic members so as to utilize the heat resistance, heat-insulating propery, high-temperature strength and wear resistance of ceramics. That is, the metal.ceramic composite article can be effectively used in engine parts, such as a turbo-charger, a piston, a tappet, a suction valve, an exhaust valve, a rocker arm, a cam and the like; and other structural parts exposed to high temperature or to repeating loads.

What is claimed is:

1. A metal-ceramic composite article, comprising:
a metallic member having a first thermal expansion and having a first end and a second end and a hole extending from said first end toward said second end, said hole having an inner peripheral surface; and
a ceramic member having a second thermal expansion and having a first portion and a second portion, said second portion being a projection extending from said first portion, said projection having an outer peripheral surface which is in press-fitted contact with said inner peripheral surface of said hole throughut substantially its entire length, such that a gap is formed between said first portion of said ceramic member and said first end of said metallic member, said gap being formed such that it is greater in size than the product of a difference in thermal expansion between said metallic member and said ceramic member, multiplied by the length of press-fitted contact between the outer peripheral surface of the projection and the inner peripheral surface of said hole, multiplied by a maximum operating temperature of the composite article.

2. The metal-ceramic composite article of claim 1, wherein said hole extends completely through the metallic member.

3. The metal-ceramic article of claim 1, wherein said metallic member has a coefficient of thermal expansion which is greater than a coefficient of thermal expansion of said ceramic member.

4. The metal-ceramic composite article of claim 1, wherein a flange having a diameter greater than an outer diameter of the metallic member is formed on a part of the metallic member on the hole side of the metallic member.

5. The metal-ceramic composite article of claim 1, wherein the ceramic member comprises a part of a rotary shaft arranged on a turbine wheel side of a turbo-charger rotor and the metallic member comprises a part of the rotary shaft arranged on a compressor wheel side of the turbocharger rotor.

6. The metal-ceramic composite article of claim 1, wherein the ceramic member comprises silicon nitride and the metallic member comprises a steel, the surface of which can be hardened by one of the methods of carburizing, nitriding and surface quenching.

7. The metal-ceramic composite article of claim 1, wherein the ceramic member comprises a part of a piston crown and the metallic member comprises a part of a piston body.

8. The metal-ceramic composite article of claim 7, wherein the ceramic member consists essentially of partially stabilized zirconia, and the metallic member consists essentially of cast iron.

9. A metal-ceramic composite article, comprising:
a metallic member having a first thermal expansion and having a first end and a second end and a hole of substantially uniform cross-section throughout its longitudinal length, said hole extending from said first end toward said second end, said hole having an inner peripheral surface; and
a ceramic member having a second thermal expansion and having a first portion and a second portion, said second portion being a projection extending from said first portion, said projection having a substantially uniform cross-section throughout its longitudinal length and an outer peripheral surface which is in press-fitted contact with said inner peripheral surface of said hole throughout substantially its entire length, such that a longitudinal gap is formed between said first portion of said ceramic member and said first end of said metallic member, said gap being formed such that it is greater in size than the product of a difference in thermal expansion between said metallic member and said ceramic member, multiplied by the length of press-fitted contact between the outer peripheral surface of the projection and the inner peripheral surface of said hole, multiplied by a maximum operating temperature of the composite article.

10. The metal-ceramic composite article of claim 9, wherein said hole extends completely through the metallic member.

11. The metal-ceramic article of claim 9, wherein said metallic member has a coefficient of thermal expansion which is greater than a coefficient of thermal expansion of said ceramic member.

12. The metal-ceramic composite article of claim 9, wherein a flange having a diameter greater than an outer diameter of the metallic member is formed on a part of the metallic member on the hole side of the metallic member.

13. The metal-ceramic composite article of claim 9, wherein the ceramic member comprises a part of a rotary shaft arranged on a turbine wheel side of a turbocharger rotor and the metallic member comprises a part of the rotary shaft arranged on a compressor wheel side of the turbocharger rotor.

14. The metal-ceramic composite article of claim 9, wherein the ceramic member comprises silicon nitride and the metallic member comprises a steel, the surface of which can be hardened by one of the methods of carburizing, nitriding and surface quenching.

15. The metal-ceramic composite article of claim 9, wherein the ceramic member comprises a part of a piston crown and the metallic member comprises a part of a piston body.

16. The metal-ceramic composite article of claim 15, wherein the ceramic member consists essentially of partially stabilized zirconia, and the metallic member consists essentially of cast iron.

17. A metal-ceramic composite article comprising:
a metallic member having a first thermal expansion and having a first and a second end and a hole of substantially uniform cross-section throughout its longitudinal length, said hole extending from said first end toward said second end, said hole having an inner peripheral surface; and
a ceramic member having a second thermal expansion and having a first portion and a second portion, said second portion being a projection extending from said first portion, said projection having a substantially uniform cross-section throughout its longitudinal length and an outer peripheral surface which is in press-fitted contact with said inner peripheral surface of said hole throughout substantially its entire length, thereby forming a monolithic bond between the metallic member and the ceramic member, such that a longitudinal gap is formed between said first portion of said ceramic member and said first end of said metallic member said gap being formed such that it is greater in size than the product of a difference in thermal expansion between said metallic member and said ceramic member, multiplied by the length of press-fitted contact between the outer peripheral surface of the projection and the inner peripheral surface of said hole, multiplied by a maximum operating temperature of the composite article.

* * * * *

UNITED STATES PATENT AND TRADEMARK OFFICE
CERTIFICATE OF CORRECTION

PATENT NO. : 4,690,617
DATED : September 1, 1987
INVENTOR(S) : I. ODA et al.

It is certified that error appears in the above-identified patent and that said Letters Patent is hereby corrected as shown below:

On the title page

In the FOREIGN PATENT DOCUMENTS, add:

2093554 9/1982 United Kingdom
    0066022 12/1982 European Pat. Off.

In the OTHER PUBLICATIONS, add

"Allowances and Tolerances", pages 1554 and 1555, Machinery Handbook, 20th Ed. 1979.

Signed and Sealed this

Twelfth Day of April, 1988

Attest:

DONALD J. QUIGG

*Attesting Officer*      *Commissioner of Patents and Trademarks*